US009881441B2

(12) United States Patent
Dillon

(10) Patent No.: US 9,881,441 B2
(45) Date of Patent: Jan. 30, 2018

(54) SYSTEMS AND METHODS FOR OPERATING A SWEEPSTAKES

(71) Applicant: VERIFY BRAND, Minneapolis, MN (US)

(72) Inventor: David Dillon, Excelsior, MN (US)

(73) Assignee: THE MEYERS PRINTING COMPANIES, INC., Minneapolis, MN (US)

( * ) Notice: Subject to any disclaimer, the term of this patent is extended or adjusted under 35 U.S.C. 154(b) by 462 days.

(21) Appl. No.: 13/826,369

(22) Filed: Mar. 14, 2013

(65) Prior Publication Data

US 2014/0274301 A1 Sep. 18, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC .................................... *G07F 17/32* (2013.01)

(58) Field of Classification Search
CPC ........ A63F 2009/2419; A63F 2009/242; A63F 2009/2425
See application file for complete search history.

(56) References Cited

U.S. PATENT DOCUMENTS

| | | | | |
|---|---|---|---|---|
| 6,443,840 | B2 | 9/2002 | Von Kohorn | |
| 7,186,180 | B2 | 3/2007 | Lathrop et al. | |
| 7,740,243 | B1 | 6/2010 | Kean | |
| 7,780,514 | B2 | 8/2010 | Walker et al. | |
| 7,878,900 | B2 | 2/2011 | Lind et al. | |
| 7,967,211 | B2 | 6/2011 | Challa et al. | |
| 8,000,749 | B1 | 8/2011 | McConnell | |
| 2003/0058261 | A1 | 3/2003 | Challa et al. | |
| 2003/0083936 | A1 | 5/2003 | Mueller et al. | |
| 2004/0128197 | A1 | 7/2004 | Bam | |
| 2006/0047573 | A1 | 3/2006 | Mitchell et al. | |
| 2006/0063589 | A1* | 3/2006 | Chong | 463/29 |
| 2006/0160617 | A1* | 7/2006 | Hansen et al. | 463/36 |
| 2008/0154715 | A1 | 6/2008 | Galinos | |

(Continued)

OTHER PUBLICATIONS

Rohs, Michael, et al., "Visual Code Widgets for Marker-Based Interaction," Proceedings of the 25th IEEE International Conference on Distributed Computing Systems Workshops (ICDCSW'05), 1545-0678/05, 2005.

(Continued)

*Primary Examiner* — Kevin Y Kim
(74) *Attorney, Agent, or Firm* — Patent Portfolio Builders PLLC

(57) ABSTRACT

Systems and methods for determining sweepstakes winners involve a display providing a code to an end-user device and the end user-device providing the displayed code to a computer, which determines whether the displayed code is a winning code. Whether a code is a winning code can be based on a variable factor, such as a geographic location, a date, a time of day, a day of a week, a number of submissions by a particular person, valued activities performed by a particular person. The identification of a code as a winning code can be performed either before the code is provided to the display or after the code is received by the computer.

15 Claims, 5 Drawing Sheets

(56) References Cited

U.S. PATENT DOCUMENTS

| | | | | |
|---|---|---|---|---|
| 2010/0160022 | A1 | 6/2010 | Oram | |
| 2010/0222026 | A1 | 9/2010 | Dragt | |
| 2010/0222041 | A1 | 9/2010 | Dragt | |
| 2010/0306060 | A1 | 12/2010 | Yancey et al. | |
| 2011/0015984 | A1 | 1/2011 | Galinos | |
| 2011/0028160 | A1 | 2/2011 | Roeding et al. | |
| 2011/0029360 | A1 | 2/2011 | Gollapalli | |
| 2011/0034230 | A1 | 2/2011 | Guziel et al. | |
| 2011/0106597 | A1 | 5/2011 | Ferdman et al. | |
| 2011/0159857 | A1 | 6/2011 | Faith et al. | |
| 2011/0178863 | A1 | 7/2011 | Daigle | |
| 2011/0238474 | A1 | 9/2011 | Carr | |
| 2011/0258024 | A1 | 10/2011 | Prince | |
| 2011/0258049 | A1 | 10/2011 | Ramer et al. | |
| 2011/0276378 | A1 | 11/2011 | Pointer | |
| 2011/0276388 | A1 | 11/2011 | Deng | |
| 2011/0282727 | A1 | 11/2011 | Phan | |
| 2011/0295673 | A1 | 12/2011 | VanNoller | |
| 2012/0010979 | A1 | 1/2012 | Ramer et al. | |
| 2012/0029994 | A1 | 2/2012 | Barkan | |
| 2012/0035997 | A1 | 2/2012 | Burgess | |
| 2012/0209709 | A1 | 8/2012 | Ramer et al. | |
| 2012/0214571 | A1* | 8/2012 | Oakes et al. | 463/17 |
| 2013/0084991 | A1* | 4/2013 | LeMay et al. | 463/42 |
| 2013/0331174 | A1* | 12/2013 | Thacker et al. | 463/22 |

OTHER PUBLICATIONS

Vartiainen, Panu, et al., “Mobile Visual Interaction Enhancing local communication and collaboration with visual interactions,” MUM ’06, Dec. 4-6, 2006, Stanford, CA, USA, 2006 ACM 1-59593-607-6/06/12.

* cited by examiner

SYSTEMS AND METHODS FOR OPERATING A SWEEPSTAKES

BACKGROUND OF THE INVENTION

Exemplary embodiments of the present invention are directed to systems and methods for controlling sweepstakes winners. In conventional sweepstakes the winning "tickets" are predetermined prior to distribution of the tickets to sweepstakes participants. For example, in a scratch-off sweepstakes the winning combinations of numbers, letters, images, etc. are predetermined so that both the entity running the sweepstakes and the sweepstakes participants can determine when a winning combination has been revealed by scratching-off a protective layer over the combination of numbers, letters, images, etc. If the entity running the sweepstakes desires to control the variability of the winning tickets the entity can, for example, control the distribution of winning tickets so that the winning tickets are distributed across a number of different geographic areas. This is the extent of control provided by conventional sweepstakes techniques.

This limited control is problematic for a number of reasons. For example, under conventional techniques there exists the possibility that all of the winning tickets are uncovered early during the sweepstakes period. Thus, it would be known that the remainder of the sweepstakes period will not produce any further winners which can be problematic when the sweepstakes is performed in connection with marketing of a product or service because there will no longer be any consumer interest in participating in a sweepstakes that can no longer produce winners. Similarly, a single person may end up winning multiple times in a single sweepstakes, which may be viewed as unfair by other sweepstakes participants.

SUMMARY OF THE INVENTION

Exemplary embodiments of the present invention provide systems and methods for determining sweepstakes winners involve a display providing a code to an end-user device and the end user-device providing the displayed code to a computer, which determines whether the displayed code is a winning code. Whether a code is a winning code can be based on a variable factor, such as a geographic location, a date, a time of day, a day of a week, a number of submissions by a particular person, valued activities performed by a particular person. The identification of a code as a winning code can be performed either before the code is provided to the display or after the code is received by the computer.

The use of a variable factor in determining a winning code allows an operator of the sweepstakes to have greater control of who receives the winning codes, such as by geographic location, day, time of day, etc. Further, a truly random distribution of sweepstakes winners may not appear to the average person to be random, and thus the present invention allows the winners to appear random to the average person. For example, randomly distributing winning codes to each of the fifty states could result in all winning codes being distributed to a single state. To the average person this would not be viewed as random because the average person would typically consider a random distribution resulting in a more even distribution of winning codes. Accordingly, by using the variable factor of the present invention the winning codes can be more evenly distributed so as to appear to be random to the average person.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
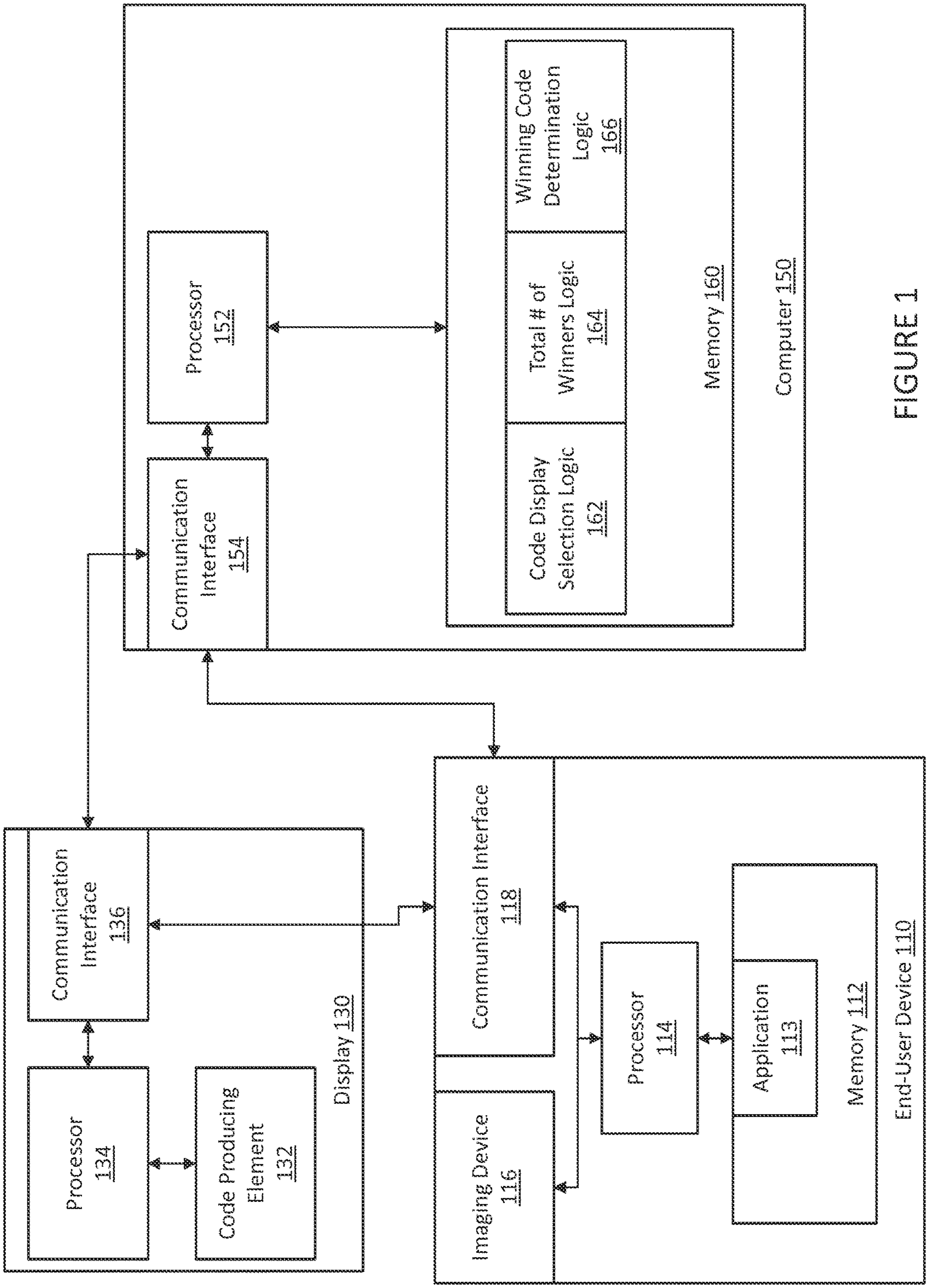
FIG. 1 is a block diagram of an exemplary system in accordance with the present invention.

FIG. 1 is a block diagram of an exemplary system in accordance with the present invention. The exemplary system includes an end-user device 110 that can obtain a sweepstakes code from a display 130 and convey the code to computer 150. As used herein, the term "sweepstakes" should be understood in a broad sense as any type of process in which any type of prize can be awarded. As will be described in more detail below, computer 150 provides codes for a sweepstakes to display 130 and a person with end-user device 110 can capture one or more codes and deliver the captured codes to computer 150, which will identify whether the captured coding is a winning code. The display 130 can be located anywhere, such as a store. The display 130 can display information in addition to the codes, such as coupons, advertisements, and the like.

The end-user device 110 can be any type of device, including a cellular telephone, smart phone, personal digital assistant (PDA), computer, tablet, slate, and/or the like. The end-user device includes a memory 112 that can store one or more applications 113, which applications are executed by processor 114. Processor 114 is connected to imaging device 116 and communication interface 118. Imaging device 116 can be any type of in aging device, such as a camera. Communication interface 118 can be one or more communication interfaces that support wired and/or wireless communications. For example, communication interface 118 can support wide area network cellular wireless communications (e.g., CDMA, LTE, GSM, WiMAX etc.) and short-range wireless communication (e.g., Bluetooth, near-field communications (NFC) RF-ID, infrared (IR), WiFi, etc.).

Display 130 includes a processor 134 operatively coupled to a code producing element 132 and a communication interface 136. Communication interface 136 can be one or more communication interfaces that support the same or different types of wired and/or wireless communications as communication interface 118 of end-user device 110. Code producing element 132 can be any type of mechanism for conveying codes for the sweepstakes to end-user device 110. For example, if the code is visually conveyed to end-user device 110 and captured using imaging device 116, code producing element 132 can be any type of visual display, including plasma, liquid crystal display (LCD), digital light projection (DLP), light emitting diodes (LEDs), organic light emitting diode (OLED), ect.

Computer 150 includes non-transitory memory 160, which stores one or more programs embodied as logic 162-166. This logic is executed by processor 152 to perform certain functions, which will be described in more detail below. Communication interface 154 can be one or more communication interfaces that support the same or different types of wired and/or wireless communications as communication interface 118 of end-user device 110 and communication interface 136 of display 130.

Although FIG. 1 illustrates a single end-user device 110 interacting with a single display 130 and a single computer 150, the present invention is not so limited. For example, end-user device 110 can interact with more than one display 130 and display 130 can interact with more than one end-user device 110. Similarly, end-user device 110 can interact with more than one computer 150 and computer 150 can interact with more than one end-user device. Moreover, display 130 can interface with more than one computer 150 and computer 150 can interact with more than one display 130.

Figure 2A:
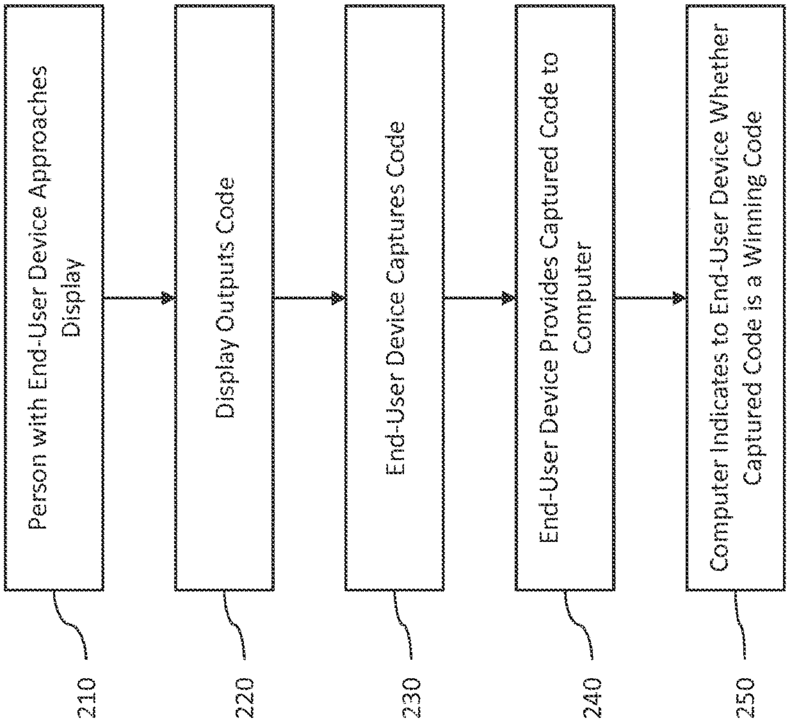
FIGS. 2A and 2B are flow diagrams of exemplary methods of an end-user device interacting with a display in accordance with the present invention.
Figure 2B:
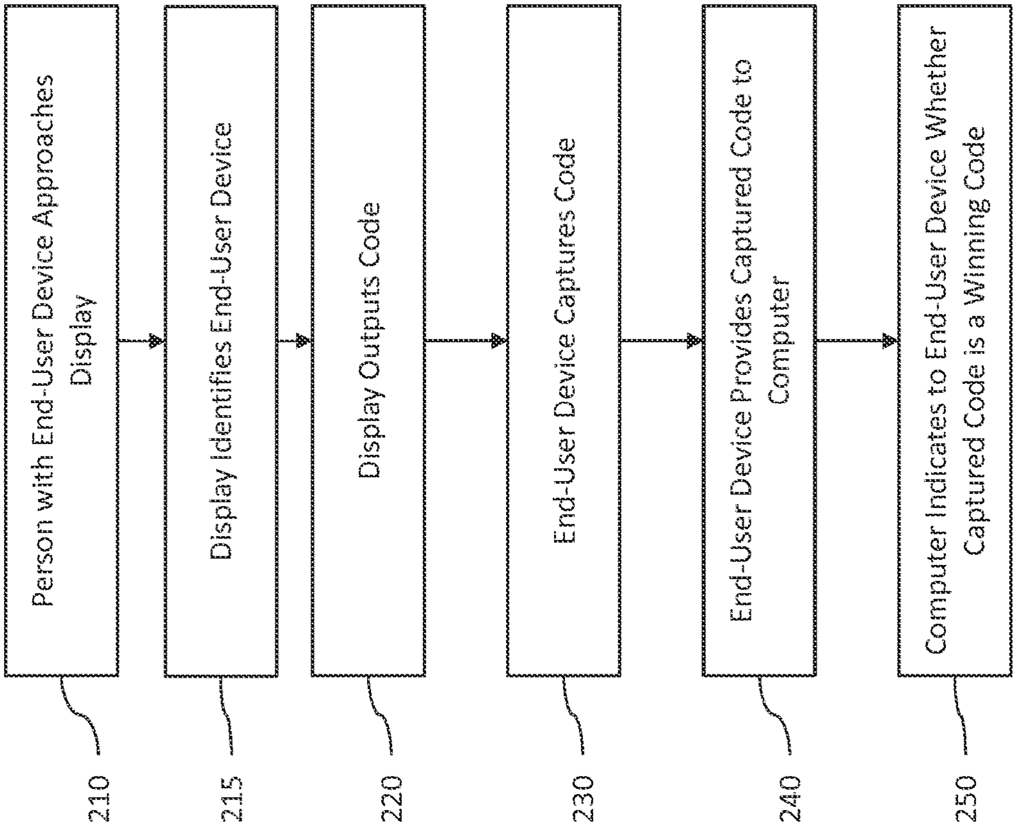

FIGS. 2A and 2B are flow diagrams of exemplary methods of an end-user device interacting with a display in accordance with the present invention. These interactions can be controlled by processor 114 executing application 113, which is loaded from memory 112. Turning first to FIG. 2A, a person with an end-user device 110 approaches a display 130 (step 210) and the display 130 outputs a code by way of code producing element 132 (step 220). The end-user device 110 captures the code (step 230). The code can be captured using imaging device 116 of end-user device 110 from code producing element 132. For example, if code producing element 132 is a visual display, the code can be displayed as an alphanumeric code, a quick response (QR) code, a bar code, and/or the like, and the imaging device 116 can capture the displayed code. The end-user device 110 can also capture the code using communication interface 118. For example, code producing element 132 can be a radio frequency identification (RF-ID) tag that is read by communication interface 118 of end-user device 110. Furthermore, end-user device 110 can receive the code from communication interface 136 using any type of wired or wireless communication technique, including, but not limited to, a Bluetooth, WiFi, or near-field communication (NFC). In this case code producing element 132 can still visually display the code to provide feedback to the operator of end-user device 110, although this is not necessary.

The end-user device 110 then provides the captured code to computer 150 (step 240). In either of the cases discussed above, the capturing of the code can cause end-user device 110 to execute application 113 to convey the code to computer 150. The code can be conveyed using any type of wired or wireless communication technique by communication interface 118 of end-user device 110 connecting directly or indirectly (e.g., through one or more networks) with communication interface 154 of computer 150. Furthermore, additional information can be conveyed with the code, such as geographic location, identification bon of a person or end-user device, time of day, day of the week, etc., which can be used in connection with the method of FIG. 3 to determine whether the captured code is a winning code, which will be described in more detail in connection with FIG. 3.

Computer 250 then determines whether the code is a winning code using the methods described below in connection FIGS. 3 and 4, and indicates the result of the determination to end-user device 110 (step 250).

The flow diagram of FIG. 2B is a variation of the flow diagram of FIG. 2A, which includes the additional step of identifying end-user device 110 (step 215). This identification can be provided from display 130 to computer 150 to determine whether to the code is a winning code (FIG. 3) or for computer 150 to select a winning code for display 130 to provide to end-user device 110 (FIG. 4). In addition to the identification, other additional information can be provided, such as geographic location, time of day, day of the week, etc. Other than this difference the methods of FIGS. 2A and 2B are performed in a similar manner.

Figure 3:
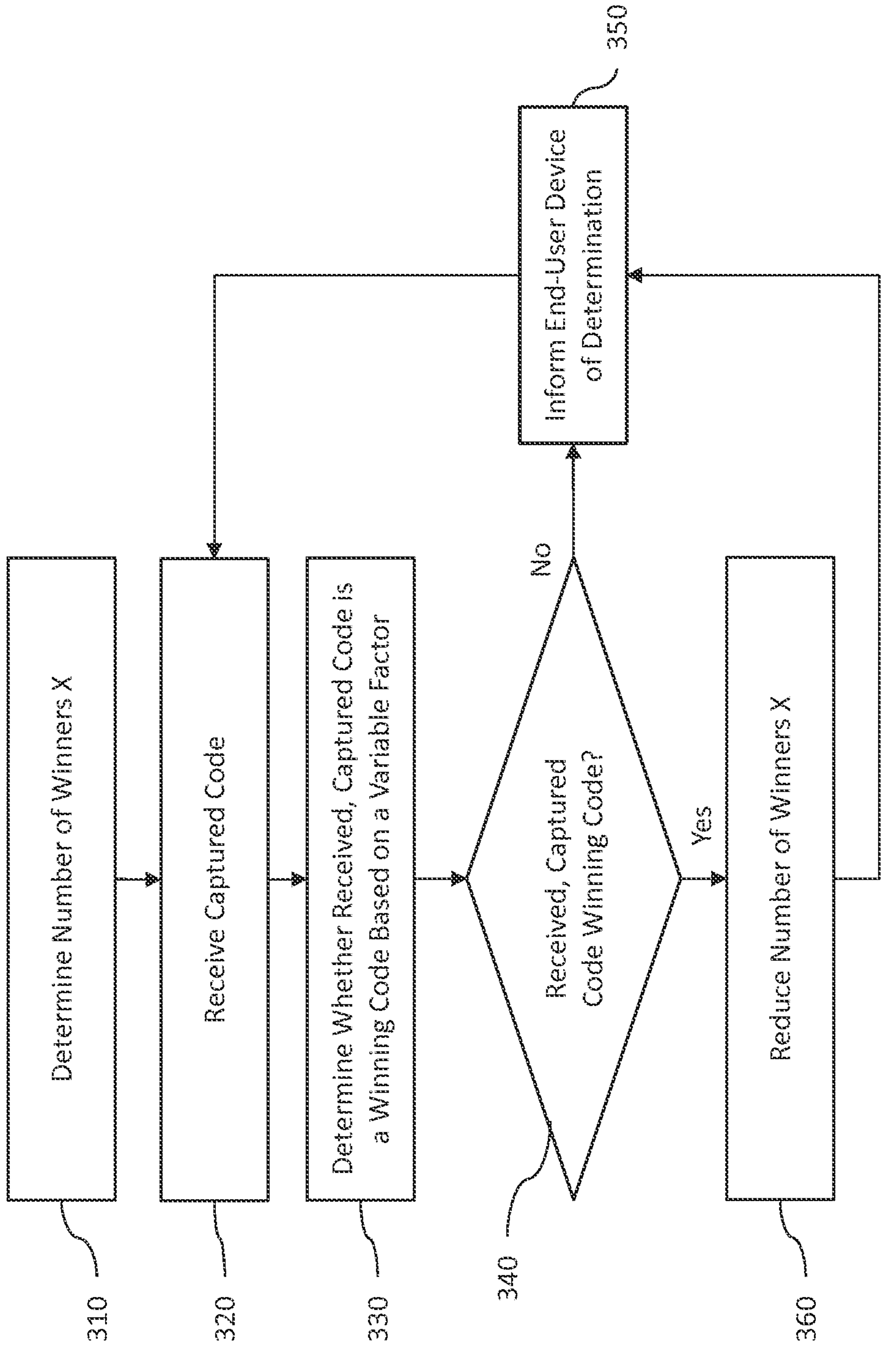
FIGS. 3 and 4 are flow diagrams of exemplary methods of a display interacting with a computer in accordance with the present invention.
Figure 4:
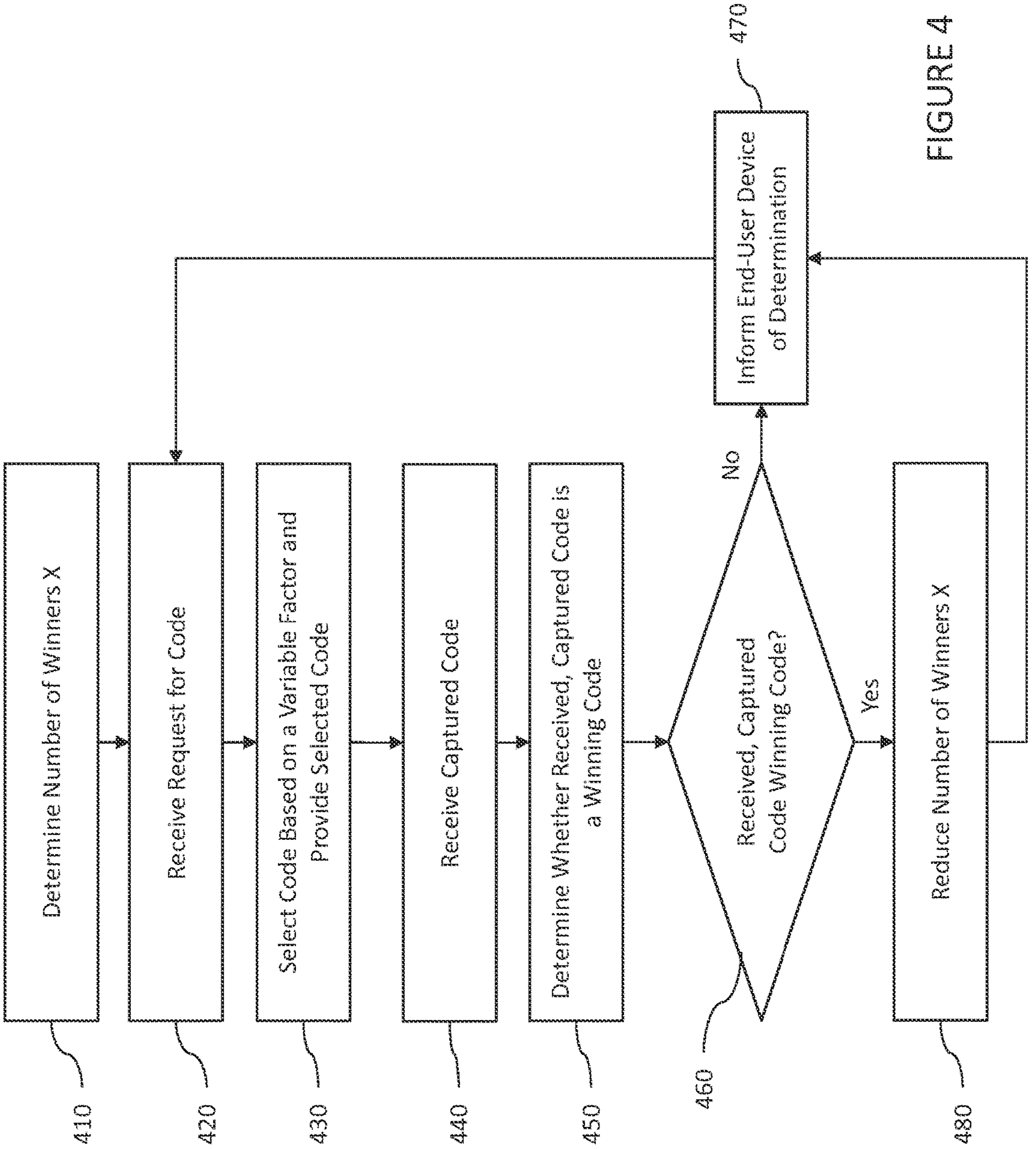

FIGS. 3 and 4 are flow diagrams of exemplary methods of a display interacting with a computer in accordance with the present invention. The difference between the methods illustrated in FIGS. 3 and 4 is that in FIG. 3 the determination of the winning code based on a variable factor is performed when the code is received by computer 150, whereas in FIG. 4 the winning code determined first and then provided to display 130.

Turing first to FIG. 3, computer 150 initially determines a number of winners X using logic 164 (step 310). This can either be determined by the computer itself or can be provided to the computer by an operator of the sweepstakes. Once the number of total winners is established the computer can then allocate winning codes from a set of codes. Specifically, computer receives a captured code from end-user device 110 (step 320) and determines, using logic 166, whether the captured code is a winning code based on a variable factor (step 330). The variable factor can be based on information provided by end-user device 110 and/or from display 130.

The variable factor can be any factor desired by the operator of the sweepstakes to control the winners and can include one or more of a geographic location, a date, a time of day, a day of a, week, a number of submissions by a particular person, valued activities performed by a particular person. Further, the variable factor can be adjusted, as desired, to control the winning codes. For example, if winning codes were randomly allocated then it could be possibly that a large number of winners are in the same geographic location, which may not be desired by the operator of the sweepstakes. Accordingly, the operator of the sweepstakes can determine that only a certain number of winning codes should come from any particular geographic region, which can be arbitrarily assigned as desired by the operator of the sweepstakes to be a city, county, state, country, etc.

Similarly, the variable factor can be adjusted so that the winning codes are distributed over a period of time of the sweepstakes, which avoids having all of the winning codes distributed before the sweepstakes has ended. For example, the sweepstakes can randomly distribute winning codes until a certain number of winning codes have been redeemed. The variable factor can then be used to space out the remaining winning codes over the remainder of the sweepstakes period.

Moreover, the sweepstakes operator may desire to reward persons that have performed certain valued activities more than persons that have not. Such valued activities could include “Friending” or “Following” the operator of the sweepstakes on a social media website or application, being a member of the sweepstakes operator’s rewards program, purchasing a certain amount of the sweepstakes operator’s products, etc.

The variable factor can be employed in any manner to achieve the sweepstakes operator’s desired goals. Thus, for example, if a winning code has been received from a particular person or end-user device, the variable factor can be used so that the particular person or end-user device is excluded from receiving another winning code or the chances that the particular person or end-user device receiving another winning code is substantially less than persons or end-user devices that have not already received a winning code. On the other hand, the variable factor can be used to increase the chance of receiving a winning code, such as being in a geographic area that has not yet received a winning code.

If computer 150 determines that the received, captured code is not a winning code ("No" path out of decision step 340), then computer 150 informs end-user device 110 of the result (step 350) and then waits to receive another captured code (step 320). If, however, computer 150 determines that the received, captured code is a winning code ("Yes" path out of decision step 340), then computer 150 reduces the number of remaining winners X by one (step 360), informs end-user device 110 of the result (step 350) and then waits to receive another captured code (step 320).

Turning now to FIG. 4, and focusing on the distinctions between the methods of FIGS. 3 and 4, when computer 150 receives a request for a code from display 130 (step 420), logic 162 selects a code based on a variable factor, such as those described above, and then provided to display 130 (step 430). Again, the variable factor can be based on information provided by end-user device 110 and/or display 130. Accordingly, when computer 150 receives a captured code (step 440), whether the code is a winning code has already been determined. Thus, the determination of whether the received, captured code is a winning code (step 450) is merely a comparison of the received, captured code with a database of codes.

If, as the result of this comparison, computer 150 determines that the received, captured code is not a winning code ("No" path out of decision step 460), then computer 150 informs end-user device 110 of the result (step 470) and then waits to receive another request for a code (step 420). If, however, computer 150 determines, based on the comparison, that the received, captured code is a winning code ("Yes" path out of decision step 460), then computer 150 reduces the number of remaining winners X by one (step 480), informs end-user device 110 of the result (step 470) and then waits to receive another request for a code (step 420). It should be recognized that the receipt of request for codes and receipt of captured codes can be performed in parallel. Accordingly, computer 150 could receive a captured code from one end-user device (step 440) directly after informing another end-user device of a determination for a captured code for the other end-user device.

For ease of explanation the discussion above mentions an operator of the sweepstakes making certain decisions. It should be recognized that in some cases the sweepstakes will be operated by a company on behalf of another company, which would be the sponsor of the sweepstakes. In that case, the sponsor of the sweepstakes could make these decisions. Regardless, unless otherwise indicated in the description or claims, the reference to the sweepstakes operator should be understood as referring to either the actual operator of the sweepstakes or the sponsor of the sweepstakes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of determining a sweepstakes winner, the method comprising:

providing a code producing element;

receiving, by a computer from an end-user device, a request for a code and an identification of the end-user device;

generating, by the computer based on a variable factor and the identification of the end-user device, a code for the end-user device;

transmitting, from the computer to the code producing element, the code for the end-user device;

receiving, by the computer from the end-user device, the code for the end-user device; and determining, by the computer, whether the code received from the end-user device is a winning code by comparing the received code with a stored code, wherein the variable factor includes at least one of a geographic location from which the code is received, a date, a time of day, a day of a week, and a number of submissions by a particular person, wherein the code producing element is a display that produces the code, wherein the code is a bar code or quick response (QR) code and the end-user device includes an imaging device that captures the code produced by the display, wherein the code for the end-user device is selected as the winning code based on the variable factor and the identification of the end-user device, and after receiving the request for the code and before the code is produced on the display.

2. The method of claim 1, wherein the display produces different codes for different end-user devices.

3. The method of claim 1, wherein the end-user device launches an application in response to the capture of the code, and the application controls the transmission of the code received from the display to the computer.

4. A method of determining a sweepstakes winner, the method comprising:

providing a code producing element;

receiving, by a computer from an end-user device, a request for a code and an identification of the end-user device;

generating, by the computer based on a variable factor and the identification of the end-user device, a code for the end-user device;

transmitting, from the computer to the code producing element, the code for the end-user device;

receiving, by computer from the end-user device, the code for the end-user device; and determining, by the computer, whether the code received from the end-user device is a winning code by comparing the received code with a stored code, wherein the variable factor includes at least one of a geographic location from which the code is received, a date, a time of day, a day of a week, and a number of submissions by a particular person, wherein the code producing element is a radio frequency identification (RFID) tag that produces the code, wherein the code for the end-user device is selected as the winning code based on the variable factor and the identification of the end-user device, and after receiving the request for the code and before the code is produced on the display.

5. The method of claim 4, wherein the RFID tag produces different codes for different end-user devices.

6. The method of claim 4, wherein the end-user device launches an application in response to the capture of the code, and the application controls the transmission of the code received from the RFID tag to the computer.

7. A system for determining a sweepstakes winner, the system comprising:

an end-user device;

a display configured to output a code associated with a sweepstakes entry, wherein the end-user device is configured to receive the outputted code; and a computer configured to receive, from the end-user device, a request for a code and an identification of the end-user device;

generate, based on a variable factor and the identification of the end-user device, a code for the end-user device;

transmit the code for the end-user device to the display;

receive the outputted code from the end-user device; and determine whether the received, outputted code is a winning code by comparing the received code with a stored code, wherein the variable factor includes at least one of a geographic location from which the code is received, a date, a time of day, a day of a week, and a number of submissions by a particular person, wherein the code is a bar code or quick response (QR) code and the end-user device includes an imaging device that captures the code produced by the display, wherein the code for the end-user device is selected as the winning code based on the variable factor and the identification of the end-user device, and after receiving the request for the code and before the code is produced on the display.

8. The system of claim 7, wherein the display is configured to produce different codes for different end-user devices.

9. The system of claim 7, wherein the end-user device is configured to launch an application in response to the capture of the code, and the application controls the transmission of the code received from the display to the computer.

10. A system for determining a sweepstakes winner, the system comprising:

an end-user device;

a display configured to output a code associated with a sweepstakes entry, wherein the end-user device is configured to receive the outputted code; and a computer configured to receive, from the end-user device, a request for a code and an identification of the end-user device;

generate, based on a variable factor and the identification of the end-user device, a code for the end-user device;

transmit the code for the end-user device to the display;

receive the outputted code from the end-user device; and determine whether the received, outputted code is a winning code by comparing the received code with a stored code, wherein the variable factor includes at least one of a geographic location from which the code is received, a date, a time of day, a day of a week, and a number of submissions by a particular person, wherein the display includes a radio frequency identification (RFID) tag that outputs the code, wherein the code for the end-user device is selected as the winning code based on the variable factor and the identification of the end-user device, and after receiving the request for the code and before the code is produced on the display.

11. The system of claim 10, wherein the RFID tag produces different codes for different end-user devices.

12. The method of claim 1, wherein the variable factor also includes valued activities performed by a particular person.

13. The method of claim 4, wherein the variable factor also includes valued activities performed by a particular person.

14. The system of claim 7, wherein the variable factor also includes valued activities performed by a particular person.

15. The system of claim 10, wherein the variable factor also includes valued activities performed by a particular person.

* * * * *